United States Patent [19]

Mori et al.

[11] Patent Number: 4,837,641
[45] Date of Patent: Jun. 6, 1989

[54] ROTARY HEAD TYPE DIGITAL SIGNAL RECORDING AND REPRODUCING APPARATUS

[75] Inventors: Takaro Mori, Sagamihara; Yasuhiro Yamada, Yokosuka, both of Japan

[73] Assignee: Victor Company of Japan, Ltd., Japan

[21] Appl. No.: 102,550

[22] Filed: Sep. 29, 1987

[30] Foreign Application Priority Data

Oct. 2, 1986 [JP] Japan .................................. 61-234959

[51] Int. Cl.⁴ .............................................. G11B 5/09
[52] U.S. Cl. ........................................................ 360/32
[58] Field of Search ................................. 360/8, 32, 73

[56] References Cited

U.S. PATENT DOCUMENTS 4,758,902  7/1988  Okamoro et al. ...................... 360/32

FOREIGN PATENT DOCUMENTS 0130091  6/1984  European Pat. Off. .
2163590  2/1986  United Kingdom .

*Primary Examiner*—Vincent P. Canney
*Attorney, Agent, or Firm*—Andrus, Sceales, Starke & Sawall

[57] ABSTRACT

A rotary head type digital signal recording and reproducing apparatus plays a magnetic tape which is prerecorded with a time division multiplexed audio signal comprising a PCM audio data and a sub-channel signal which is time division multiplexed immediately before and after the PCM audio data for each track. When carrying out an after recording of the sub-channel signal to be reproduced in a half tape speed mode, both of the rotational speed of the two magnetic heads and the tape transport speed are set identical to those at a standard tape speed mode which has a rotational speed and the tape transport speed which are twice those of the half-speed mode.

7 Claims, 11 Drawing Sheets

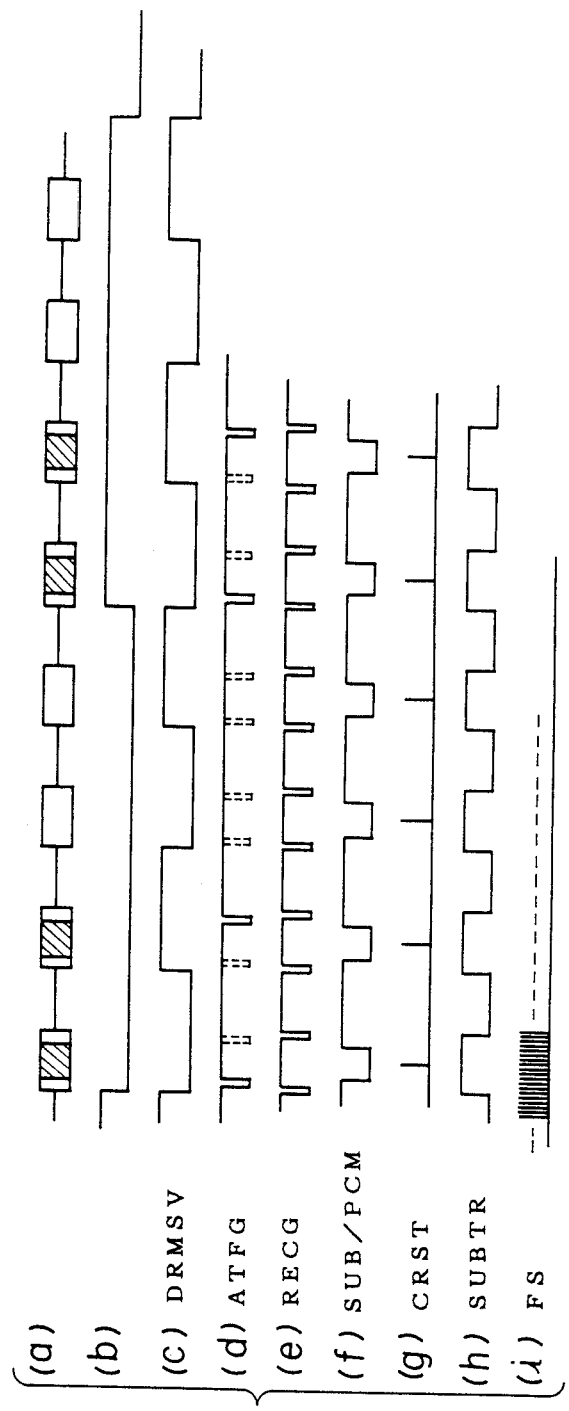

ROTARY HEAD TYPE DIGITAL SIGNAL RECORDING AND REPRODUCING APPARATUS

BACKGROUND OF THE INVENTION

The present invention generally relates to a rotary head type digital signal recording and reproducing apparatus, and in particular to a rotary head type ditital signal recording and reproducing apparatus known as R-DAT (rotary head type digital audio tape recorder) conforming to industry standards for the same, in which by use of rotary heads alternately scanning a magnetic tape, a tracking reference signal and a sub-channel signal are recorded on and reproduced from predetermined starting and ending portions of each track, while a digital audio signal is recorded on and reproduced from an intermediate track portion of each track other than the above track portions.

In a digital audio tape (DAT) recorder, an analog audio signal is modulated into PCM audio data by a pulse code modulation (PCM), and the PCM audio data are recorded on and reproduced from a magnetic tape. In a rotary head type digital audio tape recorder which employs rotary magnetic heads, data are successively recorded on and reproduced from tracks formed obliquely to a longitudinal direction of the magnetic tape without a guard band between two mutually adjacent tracks, alternately by a pair of rotary heads having gaps of mutually different azimutyh angles.

A signal format of each track formed on the magnetic tape has a PCM audio data region, a pair of tracking reference signal regions and a pair of sub-channel (subcode) signal regions. The PCM audio signal region is allocated in an intermediate portion of one track and records the PCM audio signal. The pair of the tracking reference signal regions are positioned on both sides of the PCM audio signal region. Likewise, the pair of sub-channel signal regions are positioned on both the sides of the PCM audio signal recording region. The pair of the tracking reference signal regions record the tracking reference signal. The pair of the sub-channel signal regions record a program number, a time code and the like.

Between mutually adjacent signal recording regions, there are provided inter-block gaps (IBGs). Therefore, re-recording is obtainable by separately over-writing the PCM audio data and the sub-code signal in the corresponding regions. For example, while reproducing the magnetic tape in which the PCM audio data are already recorded and monitoring a corresponding reproduced audio signal, it is possible to record on the magnetic tape the sub-code signal including a flag which indicates a program starting position relating to the monitored content, a program number indicating an order of music recorded, a program time, a table of contents (TOC) and the like. This kind of recording is called an after-recording.

At the time of the after-recording, the rotary heads successively perform the recording of the sub-code signal and the reproduction of the PCM audio data in accordance with a predetermined time allocation.

The PCM audio data are recorded and reproduced in at least two kinds of modes. In a standard tape speed mode (hereafter referred to as a standard mode) of the R-DAT standards, the PCM audio data have a sampling frequency of 48 kHz, two channels and a linear quantization of sixteen bits. On the other hand, in a half tape speed mode (hereafter referred to as a half-speed mode), the PCM audio data have a sampling frequency of 32 kHz, two channels and a non-linear quantization of twelve bits. Actually, there are other non-linear modes such as a mode in which the PCM audio data have a sampling frequency of 44.1 kHz, four channels and a quantization number of twelve bits, however, these other modes all have the same tape speed as the standard mode.

In the half-speed mode, the rotational speed of a rotary drum on which the rotary heads are mounted and the tape transport speed are respectively set to speeds which are one-half those in the standard mode. In addition, the frequency of digital signals (more accurately, the frequencies of clock pulses for producing the PCM audio data and the tracking reference signal) are set to one-half those in the standsrd mode. In other words, the operation speed of the digital audio tape recorder as a whole in the half-speed mode is set to one-half that in the standard mode, except for a part of the digital audio tape recorder where a conversion is carried out between the analog audio signal and the digital signal.

The data rate in the standard mode is 48 (kHz)×2×16=1536 (kbits/sec), and the data rate in the half-speed mode is 32 (kHz)×2×12=768 (kbits/sec). Accordingly, the sound quality obtained in the half-speed mode is slightly deteriorated when copared to that obtained in the standard mode, but there is an advantage in that the play time in the half-speed mode is twice that in the standard mode for a given length of a magnetic tape because the operation speed of the digital audio tape recorder in the half-speed mode is set to one-half that in the standard mode.

It is desirable that the half-speed mode is added to the rotary head type digital audio tape recorder having the standard mode and, in addition, that the after-recording can be satisfactory performed even in the half-speed mode. However, due to the following problems, the realization of such a digital audio tape recorder is costly and technically difficult, and would cause deterioration in the quality of the digital audio tape recorder.

First, in the after-recording at the time of the half-speed mode, the sub-code signal is recorded with a time twice that in the standard mode. For this reason, a long time is necessary for the after-recording.

Secondly, the tracking refernce signal frequency and the carrier frequency of the PCM audio data in the half-speed mode become one-half those in the standard mode. For this reason, particularly in the rproducing mode, the operation frequencies of an analog filter circuit part and a phase locked loop (PLL) circuit part for reading data within a signal processing circuit for processing the tracking reference signal and the PCM audio data must be switched between the standard and half-speed modes. Alternatively, it is necessary to provide a circuit part exclusively for use in the standard mode and another circuit part specifically for use in the half-speed mode.

Thirdly, the coupling between the rotary heads mounted on the rotary drum and recording and reproducing amplifiers is normally made through a rotary transformer. However, since the signal frequency in the half-speed mode becomes one-half that in the standard mode, the coupling in the low frequency range becomes deteriorated in the half-speed mode.

Fourthly, when the setting is made so that an optimum carrier-to-noise ratio is obtained in the standard mode, an output voltage of the reproducing rotary head in the half-speed mode becaomes one-half that in the standard mode because the relative linear velocity between the magnetic tape and the rotary head in the half-speed mode is one-half that in the standard mode. As a result of this setting, the carrier-to-noise ratio becomes deteriorated in the half-speed mode.

Fifthly, a drum motor for rotating the rotary drum and a capstan motor for rotating a capstan which drives the magnetic tape must have predetermined performances in the two rotational speeds corresponding to the standard and half-speed modes, where the predetermined performances refer to the tolerable range of the jitter in the rotation of the rotary drum for maintaining phase synchronism between the rotation of the rotary drum and an electrical circuit, the tolerable range of instability of the rotation of the capstan motor, and the like.

SUMMARY OF THE INVENTION

Accordingly, a general object of the present invention is to provide a novel and useful rotary head type digital signal recording and reproducing apparatus in which the above problems have been eliminated.

A more specific object of the present invention is to provide a rotary head type digital signal recording and reproducing apparatus in which an after recording of a sub-code (sub-channel) signal can be effectively carried out in a time which is half of that required in the conventional after-recording.

Another object of the present invention is to provide a rotary head type digital signal recording and reproducing apparatus in which a channel bit frequency (a carrier frequency) reproduced from rotary heads in a half-speed mode is made identical to that in a standard mode, and a wave equalizing circuit and a phase locked loop circuit for reading data can commonly be used in the standard mode and the half-speed mode.

Still another object of the present invention is to provide a rotary head type digital signal recording and reproducing apparatus in which a relative linear velocity between a magnetic tape and rotary heads in the half-speed mode is made identical to that in the standard mode, and output voltages of the rotary heads in the half-speed mode are substantially the same as those in the standard mode, so that the carrier-to-noise ratio of a reproduced signal in the half-speed mode may be improved.

A further object of the present invention is to provide a rotary heas type digital signal recording and reproducing apparatus in while in the half-speed mode, a drum motor and a capstan motor may rotate at a rotational speed identical to that in the standard mode, and therefore there is no deterioration in a stability in the rotation of the motor when the rotational speed is set to one-half that in the standard mode.

A still further object of the present invention is to provide a rotary head type digital signal recording and reproducing apparatus in which the coupling between rotary heads and recording and reproducing amplifiers can be improved compared to that at the time of the conventional normal recording or the conventional reproduction in a half-speed mode.

To attain the above objects and features, according to the present invention, there is provided a rotary head type digital signal recording and reproducing apparatus for playing a magnetic tape pre-recorded with a time division multiplexed signal which comprises a pulse code modulated audio data which is obtained by subjecting an original audio signal to a pulse code modulation and a sub-channel signal which amounts to a predetermined time period and which is time division multiplexed immediately before and after the pulse code modulated audio data for each track formed on the magnetic tape. The time division multiplexed signal is recorded on or reproduced from successive tracks formed obliquily to a longitudinal direction of the magnetic tape by two rotary heads in a first mode or a second mode. In the second mode, a data quantity per unit time and a bit rate of the sub-channel signal are 1/n (n is an arbitrary integer equal to 2 or over) times those in the first mode. A rotational speed of said rotary heads and a tape transport speed of the magnetic tape in the second mode are also 1/n times those in the first mode. The rotary head type digital signal recording and reproducing apparatus of the present invention comprises means for controlling the rotational speed of the magnetic heads and the tape transport speed of the magnetic tape on which data is pre-recorded in the second mode so as to become identical to those in the first mode; recording means for over-writing a new sub-channel signal to be recorded on the magnetic tape, the new sub-channel signal having a bit rate which is n time that occurring at the time of the second mode; and demodulating means for receiving the pulse code modulated audio data which is read out from the magnetic tape and for producing a monitor signal which is obtained by discretely extracting audio data from the received pulse code modulated audio data and which has a frequency identical to that occurring at the time of the reproduction in the second mode.

Other objects and features of the present invention will become apparent from the following detailed description in conjunction with the attached drawings.

BRIEF DESCRIPTION OF THE DRAWINGS

FIG. 9C (a) Through (i) shows waveforms generated by the timing signal generating circuit shown in FIG. 9B.

DETAILED DESCRIPTION

Figure 1:
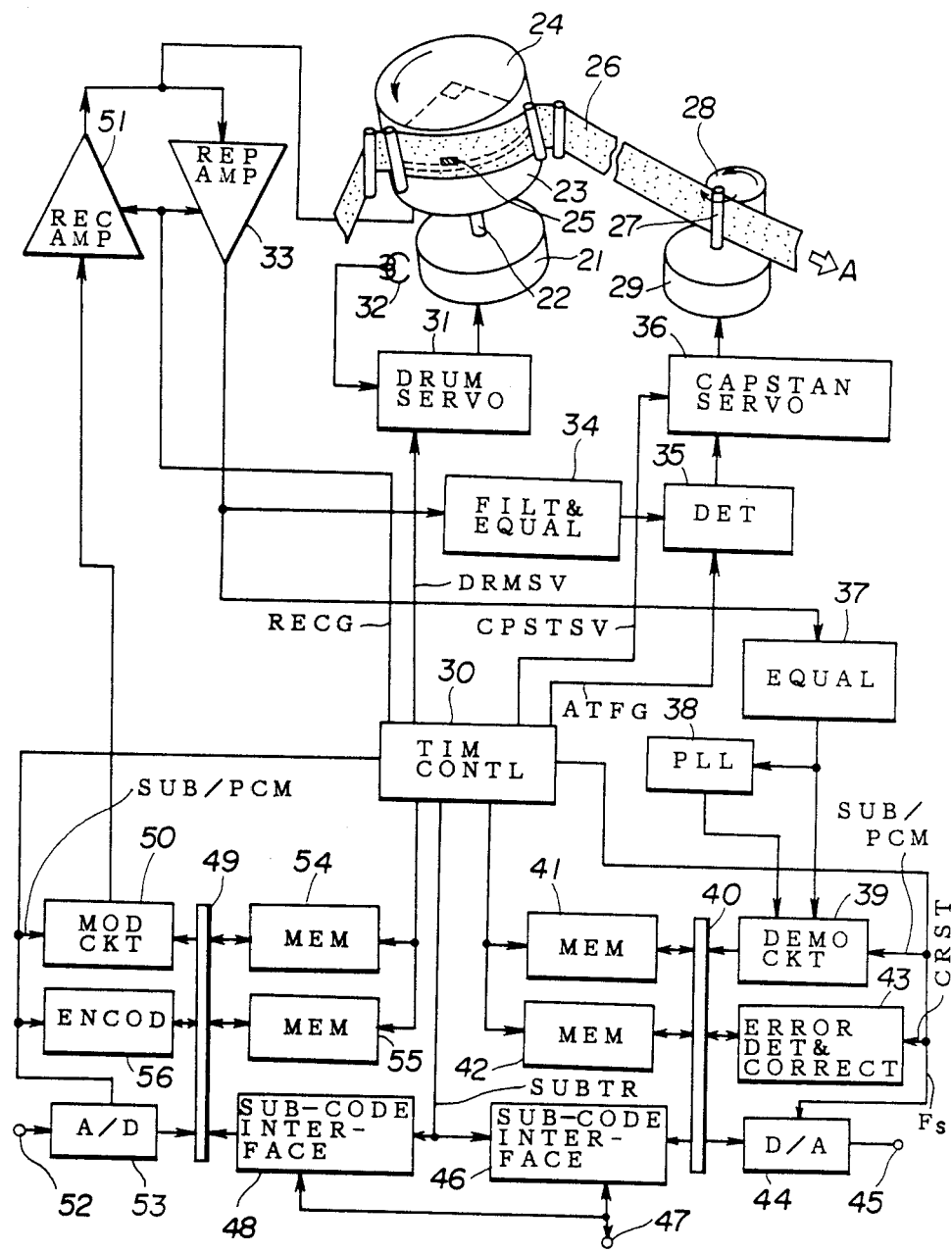
FIG. 1 is a system block diagram of an example of a rotary head type digital signal recording and reproducing apparatus of the present invention.

A description will be given of a system block diagram of an example according to the present invention, by referring to FIG. 1.

A rotary shaft 22 of a dram motor 21 penetrates a central portion of a stationary drum 23 and is fixed to a central portion of a rotary drum 24. A rotary head 25 and another rotary head (not shown) are mounted at the diametrical positions on a rotational plane of the rotary drum 24. A magnetic tape 26 is wrapped obliquely around a peripheral surface of the rotary drum 24 for an angular range of approximately 90°. The magnetic tape 26 is transported in a direction A in a state pinched between a capstan 27 and a pinch roller 28. The rotary head 25 and the other rotary head have gaps of mutually different azimuth angles. Further the two rotary heads have a track width greater than a track width of the tracks on the magnetic tape 26. For exampe, the track width of the two rotary heads is 1.5 times the track width of the tracks. The rotary shaft 22 rotates unitarily with the rotary drum 24. In the standard mode, the rotary heads rotate at a rotational speed of 2,000 rpm, for example, whereas the rotary heads also rotate at one-half the speed in the standard mode, or 1,000 rpm, in the half-speed mode. In the half-speed mode, the tape transport speed of the magnetic tape 26 which is driven by the capstan 27 is set to one-half the tape transport speed in the standard mode.

Figure 2:
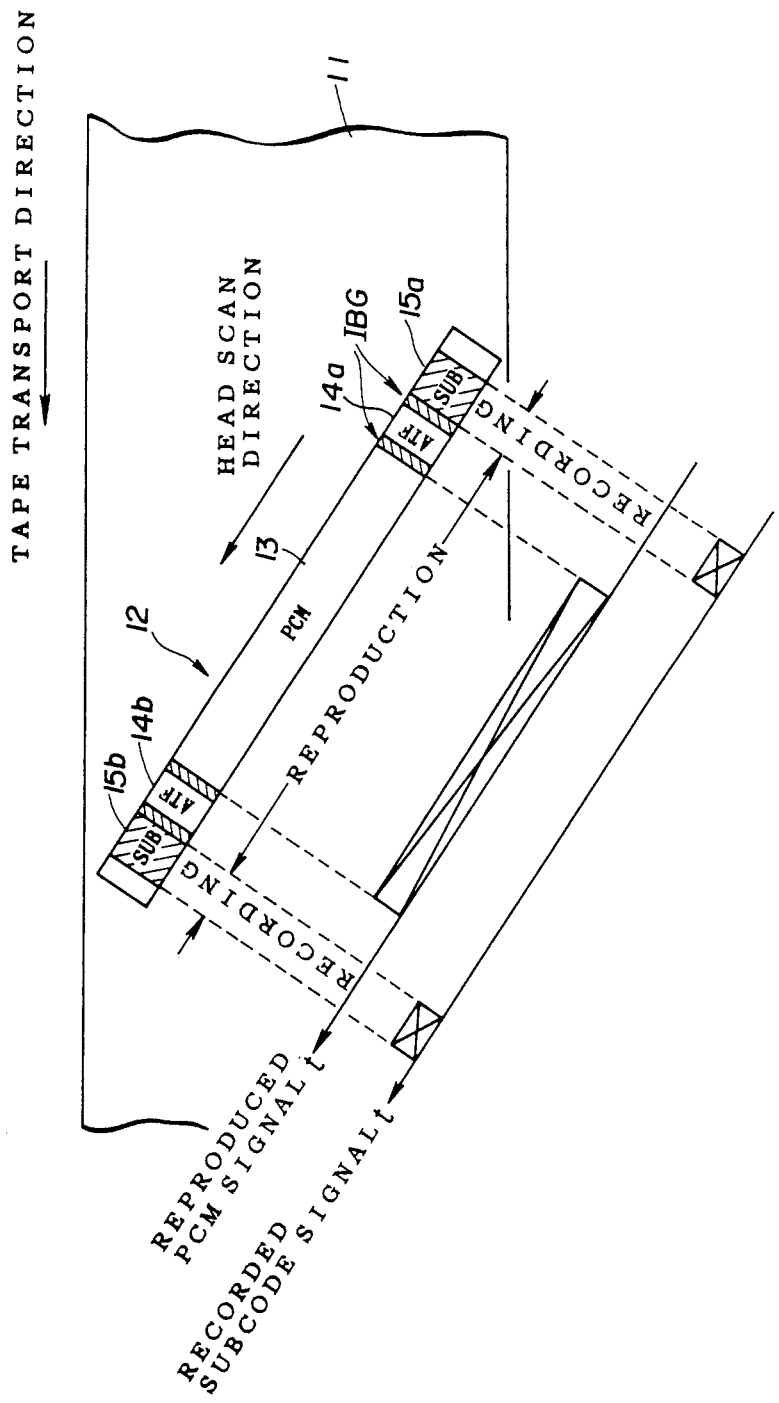
FIG. 2 is a view showing signal recording regions formed in one tracck on a magnetic recording tape.

On the magnetic tape 26, information is already recorded in the half-speed mode, and has a track pattern as shown in FIG. 2. This figure shows only one of a plurality of tracks. As illustrated, a PCM audio data region 13 is allocated in an intermediate portion of a track 12 formed on a magnetic tape 11. In both sides of PCM audio data region 13, there are provided a pair of tracking reference signal (also called an automatic track find (ATF) signal) regions 14a and 14b and a pair of sub-channel (sub-code) signal regions 15a and 15b. The tracking reference signal is used to find positions of the PCM audio data. There are also provided inter-block gaps (IBGs) between mutually adjacent signal regions of the regions 13, 14a, 15a, 14b, and 15b. The presence of the inter-block gaps makes it possible to separately over-write the PCM audio data and sub-code signal on the corresponding signal regions. One track constituted as shown in FIG. 2 comprises the digital signal of 196 block length. The 196 block length of the digital signal includes the PCM audio data of 128 blocks and the sub-code signal of 16 blocks, for exmaple. The 16 blocks of sub-code signal are equally divided into the starting and ending portion of one track. Furthermore, one block is composed of PCM audio of 32 symbols, for example. One symbol is made up of 8 bits.

As described above, the magnetic tape 26 is a magnetic tape on which information si pre-recorded in the half-speed mode. when reproducing the information recorded on the magnetic tape 26 in the half-speed mode where the rotational speed of the rotary drum 24 and the transport speed of the magnetic tape 26 are set the same as those at the time of the recording, an envelope of the reproduced signal schematically shown in FIG. 3(A) is obtained.

Now, although not directly related to the subject matter of the present invention, a description will be given on a proposal by the assignee of the present invention, in order to facilitate the understanding of the present invention.

Figure 3:
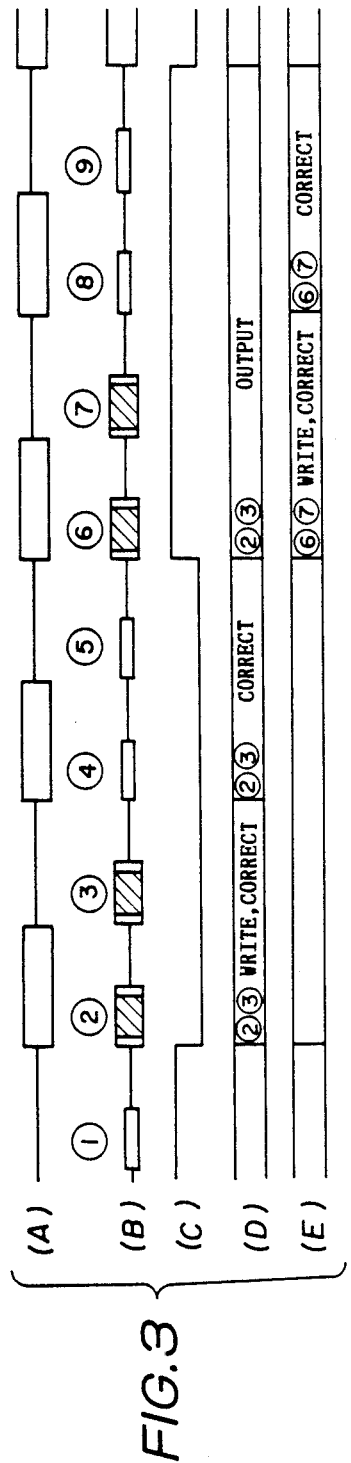
FIGS. 3(A) through 3(E) are views for explaining timing upon reproduction in a half-speed mode, timing upon reproduction in a half-speed and timing upon write and read-out operations of memories which has been previously proposed by the assignee of the present application.

FIG. 3(B) schematically shows another envelope of a reproduced signal based on a Japanese Patent Application No. 209243/86 filed on Sep. 5, 1986, entitled "ROTARY HEAD TYPE DIGITAL SIGNAL REPRODUCING APPARATUS". The envelope shown in FIG. 3 (B) is obtained when the rotational speed of the rotary drum 24 is identical to that in the standard mode and the transport speed of the magnetic tape 26 is identical to that in the half-speed mode. In this case, the rotary heads scan two mutually adjacent tracks four times. However, the scanning loci of the heads do not coincide with the recorded tracks. In addition, the recorded signal on the adjacent track is hardly reproduced due to the azimuth loss effect. For these reasons, the envelope of the reproduced signal varies as shown in FIG. 3(B). In FIG. 3(B), ① and ② indicate reproduced signals relating to a first track, ③ and ④ indicate reproduced signals relating to a second track, and ⑤ and ⑥ indicate reproduced signal relating to a third track. In this way, one track is scanned two times and the reproduced signals are obtainable as shown in FIG. 3(B).

According to the reproducing apparatus previously proposed by the present assignee, as shown in FIG. 3(C), a write operation and a read-out operation of memories 41 and 42 which will be described later, are alternately carried out for every two revolutions of the rotational drum 24 in response to a memory switching signal which is inverted for every two revolutions of the rotary drum 24. FIG. 3(D) schematically shows a write period and a read-out period of a first memory on the reproduction system and an error correcting operation period by an error detecting and correcting circuit. Further, FIG. 3(E) schematically shows a write period and a read-out period of a second memory on the reproduction system and the error correcting operation period by the above error detecting and correcting circuit.

As may be seen from FIGS. 3(D) and 3(E), data in the reproduced signals ④,⑤,⑧ and ⑨ are inhibited from being written into the memory. Therefore, the reproduced PCM audio data of the digital form which are indicated by hatching in FIG. 3(B) are converted into corresponding analog data and outputted as a reproduced audio signal.

On the other hand, according to the present invention, the rotational speed of the rotary drum 24 and the transport speed of the magnetic tape 26 are set to twice those occurring at the time of the half-speed mode. That is, the rotational speed and the transport speed are equal to those occurring at the time of the standard mode. Under these conditions, the recording of the sub-channel signal (sub-code signal) and the reproduction of the PCM audio signal with respect to the magnetic tape on which information is beforehand recorded in the half-speed mode are carried out in the half-speed mode.

Figure 4:
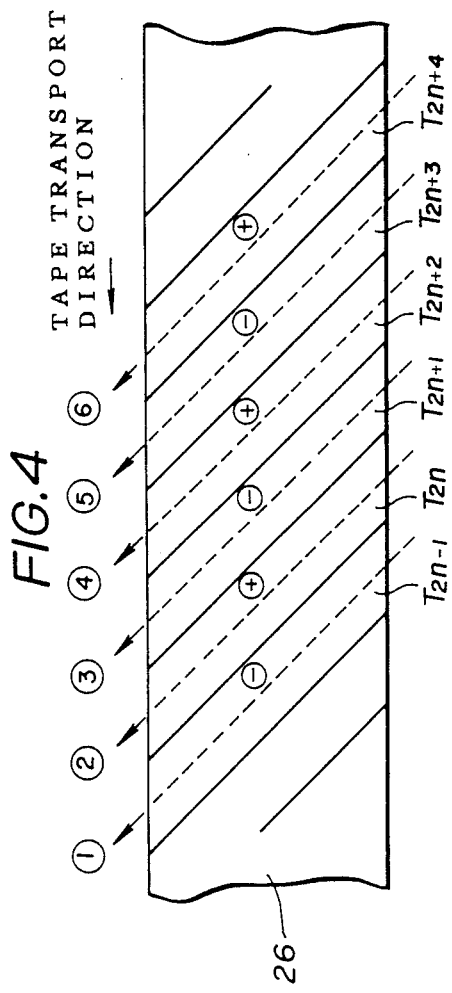
FIG. 4 is a view for explaining scanning loci formed on the magnetic tape according to the present invention.

Accordingly, as schematically shown in FIG. 4, two rotary heads including the head 25 scan tracks on the magnetic tape in a state where loci of the center lines of two rotary heads coincide with recording tracks $T_{2n-1}$, $T_{2n}$, ..., $T_{2n+4}$ in the order of ①→②→③→ ... Therefore, as shown in FIGS. 3(A) and 6(A), in the mode of the present invention, conventional reproduced waveforms each having a uniform envelope are obtained as in the case of the conventional reproduction in the half-speed mode. However, the bit rate of the reproduced signal is twice that occurring at the time of the recording in the half-speed mode. In FIG. 4, ⊖ indicates a negative azimuth angle of the rotary heads, ⊕ indicates a positive azimuth angle thereof. In addition, ②-⑥ shown in FIGS. 5(A) and 6(A) correspond to the scanning loci ②-⑥ shown in FIG. 4.

Returning to FIG. 2, at the time of the after recording of the sub-code signal which is to be reproduced in the half-speed mode, the drum motor 21 and the rotary drum 24 rotate at a rotational speed of 2,000 rmp which is twice that occurring at the time of the recording. The rotational speed of the drum motor 21 and the rotary drum 24 is controlled by a control signal which is produced by a drum servo circuit 31 on the basis of a control signal (DRMSV) supplied by a timing control circuit 30. In addition, a rotational phase of the drum motor 21 and the rotary drum 24 is controlled in accirdance with the output signal of the drum servo circuit 31 which is also based on a drum pulse obtained by the detection of the revolution of the rotary drum 24 by means of a revolution detecting head 32.

At the time of the above after recording which is to be reproduced in the half-speed mode, the capstan 27 and the capstan motor 29 rotate at a rotational speed such that the transport speed of the magnetic tape is twice that occurring at the time of the recording, that is, is equal to the speed in the standard mode. The rotational speed of the capstan 27 and capstan motor 29 is controlled in accordance with a signal which is generated by a capstan servo circuit 36 on the basis of a control signal (CPSTSV) form the timing control circuit 30. In addition, the rotational phase of the capstan 27 and the capstan motor 29 is controlled in response to the output signal of the capstan servo circuit 36 which is also based on a tracking reference signal which is derived from a track reference signal detecting circuit 35 in response to a timing signal (ATFG) from the timing control circuit 30. Therefore, the rotary heads can accurately scan the recording tracks formed on the tape 26.

A signal alternately reproduced from the tape 26 by the two rotary heads is passed through a rotary transformer (not shown) and a reproducing amplifier 33, and is supplied to a wave equalizing circuit 37 and a filtering and wave equalizing circuit 34. The circuit 34 filters the output signal of the reproducing amplifier 23 and supplies the tracking reference signal detecting circuit 35 with the extracted tracking reference signal. This tracking reference signal is a time series composite signal of a synchronizing signal of a relatively high frequency having the azimuth loss effect and a pilot signal of a relatively low frequency which is reproduced as a crosstalk from the adjacent track having little azimuth loss effect.

The tracking reference signal is recorded on the magnetic tape 26 in the half-speed mode with a frequency which is one-half that in the standard mode. However, at the time of the after recording of the sub-code signal which is to be reproduced in the half-speed mode, the rotary drum 24 rotates at the rotational speed which is twice that occurring at the time of the recording which is carried out in the conventional half-speed mode. In addition, the transport speed of the tape 26 is set to a speed twice that occurring at the time of the recording. Thus, at the time of the half-speed mode, the above tracking reference signal is reproduced with a frequency which is substantially the same as that in the standard mode. As a result, the filtering and wave equalizing circuit 34 can commonly be used for both the standard and half-speed modes. Similarly, at the time of the after recording of the sub-code signal which is to be reproduced in the half-speed mode, the carrier frequency of the PCM audio data becomes identical to that occurring at the time of the reproduction in the standard mode. For this reason, the wave equalizing circuit 37 and a phase locked loop (hereafter referred to as PLL) circuit 38 can commonly be used for both the standard and half-speed modes.

A tracking error signal extracted from the tracking reference signal detecting circuit 35 is supplied to the capstan servo circuit 36 together with the output signal from the timing control circuit 30. Then, the capstan servo circuit 36 controls the capstan motor 29 so that the rotary heads can scan the predetermined tracks.

On the other hand, modulated PCM audio data (including parity code) obtained from the wave equalizing circuit 37 are supplied to the phase locked loop circuit 38 and a demodulating circuit 39. A reproduced clock pulse signal obtained from the PLL circuit 38 is supplied to the demodulating circuit 39 and is used to demodulate the modulated PCM audio data. In response to a timing signal (SUB/PCM) from the timing control circuit 30, the demodulating circuit 39 selectively supplies to a data bus 40 the PCM audio data or the sub-code signal.

The PCM audio data are selectively written into a memory 41 or a memory 42. In this write operation, the memories 41 and 42 are switched so that either one is selected to write the PCM audio data on the data bus to therein. According to the present invention, there are two kinds of the switching operations of the memories 41 and 42.

Figure 5:
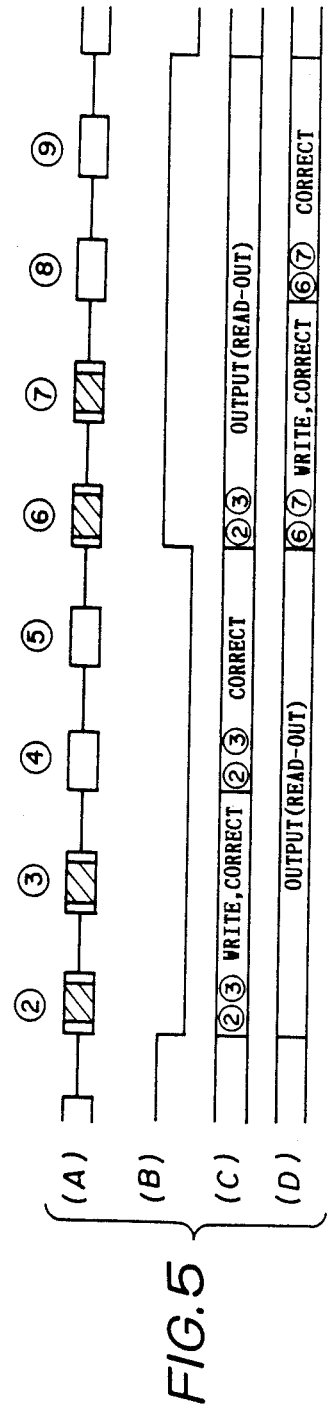
FIGS. 5(A) through 5(D) are views for explaining data write and read-out operations of memories in an embodiment of the present invention.
Figure 6:
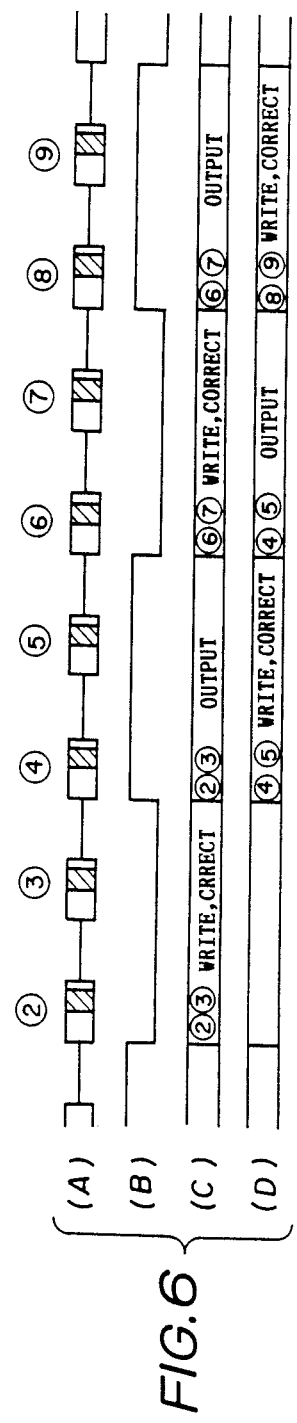
FIGS. 6(A) through 6(D) are views for explaining data write and read-out opertaions of memories in another embodiment of the present invention.

According to one of the switching operations, one of the memories 41 and 42 is selected in response to a memory switching signal shown in FIG. 5(B) which is inverted for every two revolutions of the rotary drum 24 in the same way as at the time of the conventional reproduction in the half-speed mode. In this switching operation, the PCM audio data indicated by hatchings in FIG. 5(A) are reproduced for every other revolution of the rotary heads. This reproducing operation is hereafter referred to as a mode #1 for convenience. According to the other switching manner, one of the memories 41 and 42 is selected in response to another memory switching signal shown in FIG. 6(B) which is inverted for every revolution of the rotary head. Therefore, as shown in FIG. 6(A), the PCM audio data relating to the latter half of each track are reproduced. This reproducing operation is hereafter referred to as a mode #2. In the mode #2, an interleaving recording is carried out so that the PCM audio data are alternately recorded on two mutually adjacent tracks. Sampling frequencies of the reproduced PCM audio data which are inputted to a digital-to-analog (hereafter referred to as D/A) converter 44 which will be described later, are set identical to each other in the modes #1 and #2. In the sampling frequency in each of the modes #1 and #2 is set to a frequency of 32kHz which is the same as that at the time of the conventional reproduction in the half-speed mode.

A description will first be given of the mode #1. The memory switching signal shown in FIG. 5(B) derived from the timing control circuit 30 is supplied to the memories 41 and 42 together with an address signal which will be described in detail later. As schematically shown in FIG. 5(C), the reproduced PCM audio data relating to two mutually adjacent tracks which are outputted to the data bus 40 when the scanning loci ②and③ are formed, are written in the memory 41. On the other hand, as shown in FIG. 5(D), the reproduced PCM audio data relating to two mutually adjacnt tracks which are outputted to the data bus 40 when the scanning loci ⑥and⑦ are formed, are written in the memory 42.

The reproduced PMC audio data stored in the memories 41 and 42 are at once read out therefrom and supplied to an error detecting and correcting circuit 43 through the data bus 40. The error detection and correction is intiated by a signal (CRST) provided by the timing control operation is carried out by the circuit 43, the error-corrected reproduced PCM audio data are again written into the memories 41 and 42 through the data bus 40. When the error correction cannot be performed, an error flag is written into a parity region allocated in the memories 41 and 42. In FIGS. 5(C) and 5(D), an error correction period by the error detecting and correcting circuit 43 is shown.

In addition, as will be understood from FIGS. 5(C) and 5(D), when one of the memories 41 is performing the write operation, the other is performing the read-out operation. Further, with respect to the memories 41 and 42, the memory is inhibited from writing the PCM audio data ④ and⑤, for example) which is reproduced during the latter one revolution out of the two revolution period of the rotary drum 24 in the read-out operation. Therefore, the PCM audio data alternately read out from the memories 41 and 42 for every two revolutions of the rotary drum 24 are PCM data which are reproduced during the time indicated by hatched sections of the reproduced signal schematically shown in FIG. 5(A). In this operation, the PCM audio data reproduced during the latter revolution of the two revolution period is inhibited from being written into the memories 41 and 42. However, these data are correctly reproduced. Therefore it is possible to write the PCM audio data from the tracks ② and ③ into the memory 41, and then to write the PCM audio data from the tracks ④ and ⑤ into the memory 41. Thereafter, the PMC audio data are outputted to the data bus 40.

The PCM audio data in the memories 41 and 42 are subject to processes such as a time base expansion, a de-interleaving, a jitter absorption and the like. The PCM audio data read out from the memories (demodulated data) are supplied to the D/A converter 44 through the data bus 40 and are converted into a corresponding analog signal in accordance with a timing clock (Fs) generated by the timing control circuit 30. The error flag described above is read out beforehand when the data are fed to the D/A converter 44 and is used to discriminate whether the data of the memories 41 and 42 valid or invalid. When the data are discriminated as being invalid, the outputter data are replaced with data which are obtained by carrying out an interpolation calculation by use of data immediately preceding and following the outputted data having errors. An analog audio is obtained from the D/A converter 44 and is supplied to an output terminal 45.

On the other hand, at the time of the conventional reproduction, a reproduced sub-code signal from the demodulating circuit 39 is passed through the data bus 40 and supplied to a memory region within a sub-code interface circuit 46. The reproduced sub-code signal is stored in this memory and then fed to an input/output terminal 47 in response to a timing signal (SUBTR) from the timing control circuit 30. However, at the time of the after recording in the mode #1, the reproducing amplifier 33 is disabled by an output control signal from the timing control circuit 30 so that the outputting operation of the reproducing amplifier 33 is inhibited. In addition, at the time of the after recording, a recording amplifier 51 is made active. Hence, the sub-code signal which is already recoded on the magnetic tape 26 is not subject to the reproduction.

As metioned above, according to the recording method #1, the analog audio signal corresponding to the PCM audio data which are reproduced for every other revolution of the rotary drum 24 are applied to the output terminal 45. Data corresponding to one frame (composed of two tracks) arer reproduced in the time series order of sampled data in the same way as the time of the conventional reproduction in the half-speed mode. Therefore, a pitch of audio signal which is reproduced according to the method #1 of the present invention is not considerably different from the pitch of the audio reproduced according to the conventional reproduction from the point of view of auditory sense. In this case, the tempo of the reproduced audio signal according to the mode #1 is substantially twice that according to the conventional reproduction. This is because the reproduced audio is constituted with samples which are extracted every other frame (every two rotations of the rotary drum 24) (every two revolutions of the rotary drum 24) for the PCM audio data on the magnetic tape 26.

A more detailed description will be given of the mode #1 of the present invention, by referring to FIGS. 7(A) through 7(K).

Figure 7:
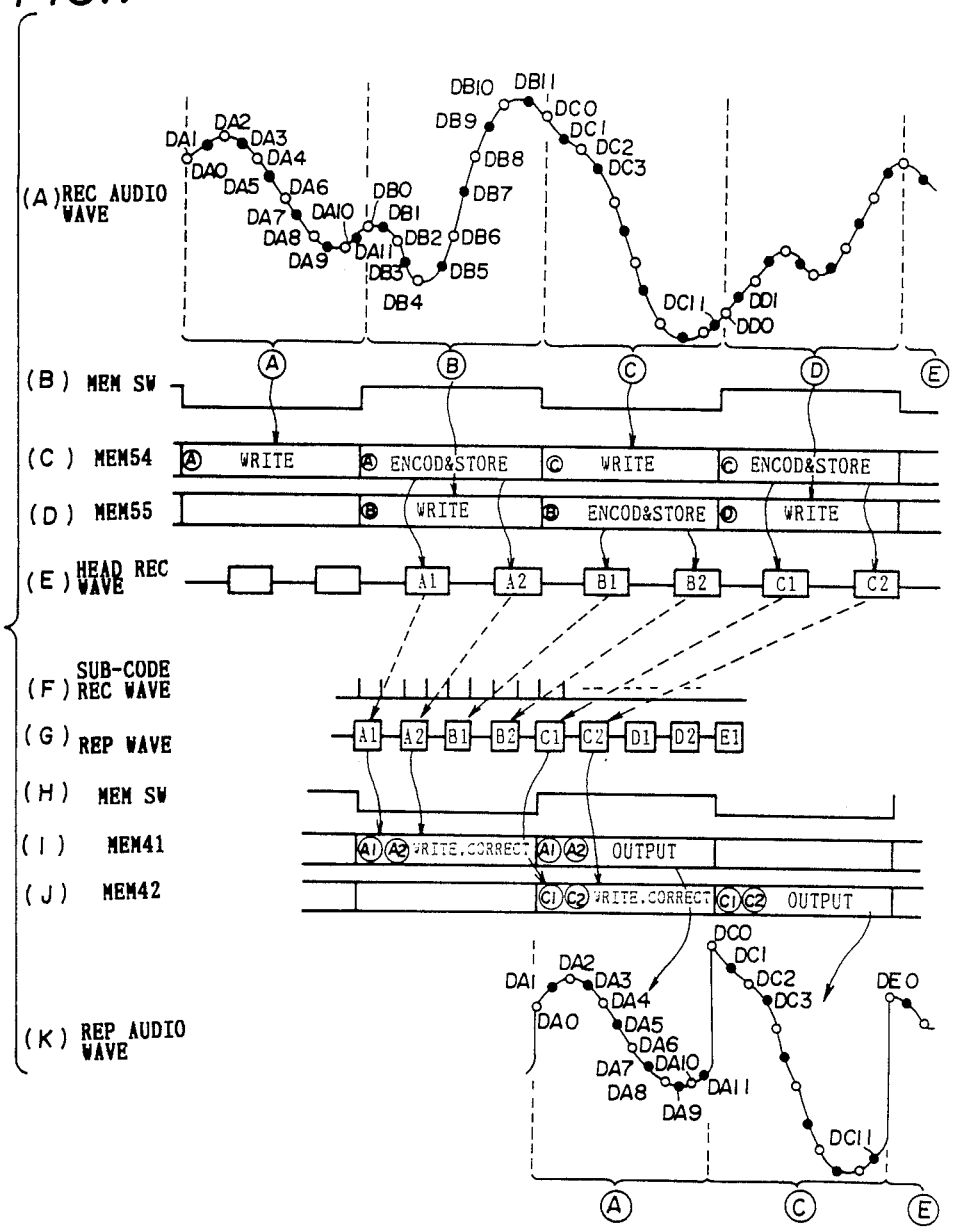
FIGS. 7(A) through 7(K) are views for explaining the operations shown in FIGS. 5(A) through 5(D) in more detail.

It is assumed that a waveform of an audio signal to be recorded on the magnetic tape 26 is indicated with a solid line in FIG. 7(A). It is further assumed that PCM audio data are a time series composite signal of sampled data which are indicated by symbol "○" and symbol "●" in FIG. 7(A). Moreover,Ⓐ,Ⓑ,Ⓒ,... shown in FIG. 7(A) each represent one frame section corresponding to two tracks). For convenience, in the illustrated example, the number of sampled data which are succesively recorded on two mutually adjacent tracks corresponding to one frame is twelve. These twelve data are data relative to one channel in this example. It should be noted that actually, there exist sampled data amounting to two channels and there are 1,920 sampled data within a time corresponding to one frame of each channel.

A description will now be given of a recording system of an audio signal, by referring to FIGS. 1 and 7(A) through 7(K). The analog audio signal (FIG. 7(A)) applied at an input terminal 52 is converted onto the PCM audio data by an digital-to-analog (hereafter referred to as D/A) converter 53. The PCM audio data from D/A converter 53 is passed through a data bus 49 and is selectively written into memories 54 and 55 in accordance with the memory switching signal shown in FIG. 7(B). A parity code generated by a coding circuit (encoder) 56 is added to the PCM audio data in the memories 54 and 55. In addition, interleaving and time base compression processes are carried out for the PCM audio data to which the parity code is added. Thereafter, the PCM audio data selectively read from the memories are supplied to a modulating circuit 50. The operation of the memory 54 is schematically shown in FIG. 7(C), and the operation of the memory 55 is also schematically shown in FIG. 7(D). As clearly shown in these figures, the memories 54 and 55 alternately write the PCM audio data amounting to one frame andd compress the written data on the time base. Therefore, the PCM audio data can be read out from the memories during a period which is shorter than the period corresponding to one frame.

The sub-code signal to be recorded is passed through the input/output terminal 47 and supplied to the sub-code interface circuit 48, in which the parity code is added thereto. Thereafter, the sub-code signal with the parity code added is passed through the data bus 49 and fed to the modulating circuit 50 in synchronization to the timing control signal (SUB/PCM) from the timing control circuit 30.

The timing control circuit 30 generates the tracking reference signal described before during a period corresponding to the tracking reference signal recording section. In addition, the timing control circuit 30 generates a gate signal indicating whether a modulated digital signal derived from the modulating circuit 50 should be outputted or the tracking reference signal should be outputted. The tracking reference signal and the gate signal are supplied to the modulating circuit 50.

On the basis of these signals, the modulating circuit 50 modulates the PCM audio data and the parity code within a predetermined period which are read out from the memories 54 and 55. Further the demodulating circuit 50 demodulates the sub-code signal to which the parity code is added. The modulation in the modulating circuit 50 may be carried out by use of conventional modulating method such as an 8-10 conversion. As a result, a modulated digital signal is generated. In adddition, the modulating circuit 50 carries out the time division multiplex of the tracking reference signal to the modulated digital signal. Therefore, a time-divided multiplexed signal including the modulated digital signal and the tracking reference signal is outputted from the modulating circuit 50. The time-divided multiplexed signal is passed through the recording amplifier 51 and the rotary transformer (not shown) and is supplied to two ratary heads. The rotary heads record information corresponding to the time-divided multiplexed signal on the magnetic tape 26 at the standard mode or the half-speed mode. As a result, the track patterns as shown in FIG. 2 are formed.

FIG. 7(E) schematically shows recorded sections (recorded waveforms) of the PMC audio data which are fed to the two rotary heads. For example, in the recording section A1, six sampled data in the section , that is DA0, DA2, DA4, DA7, DA9 and DA11 are recorded on one track in this the order. In the recording section A2, the remaining six sampled data in the section ④, that is DA6, DA8, DA10, DA1, DA3, and DA5 are recorded on the next one track in this order. At the time of the recording in the half-speed mode described above, the rotary drum 24 is controlled so as to rotate at a rotational speed of 1,000 , rpm which is half of that in the standard mode (2,000 rpm), and the magnetic tape 26 is controlled so as to be transported at a speed which is one-half that in the standard mode.

A description will now be given of an operation of the present apparatus at the time of the after recording of the sub-code signal in accordance with the mode #1. In this case, the rotary drum 24 and the magnetic tape 26 on which information is already recorded are controlled so as to rotate and be transported at speeds which are twice those at the time of the half-mode. In other words, the rotary drum 24 and the tape 26 are driven at speeds which are equal to those in the standard mode. A new sub-code signal for the after recording is passed through the input/output terminal 47 and is supplied to an sub-code interface circuit 48. A parity code generated by the coding circuit 56 is added to this sub-code signal in the sub-code interface circuit 48. The sub-code signal with the parity code added is extracted from the sub-code interface circuit 48 in accordance with timing, as shown in FIG. 7(F), based on an output timing control signal delivered from the timing control circuit 30. It should be noted that the bit rate if the pulse shown in FIG. 7(F) is twice that at the time of the conventional recording in the half-speed mode. The sub-coded signal with the parity code added is passes through the data bus 49 and the modulating circuit 50 and is supplied to the recording amplifier 51 at the twice bit rate. At the time of this after recording, the recording amplifier 51 is made active by the control signal from the timing control circuit 30 so that the recording amplifier 51 is maintained active only during a period when the rotary heads including the rotary head 25 scan the sub-code signal regions 15a and 15b shown in FIG. 2. On the contrary, the reproducing amplifier 33 is disabled during that period. Therefore, in accordance with the timing as shown in FIG. 7(F), the recording amplifier 51 provides the two rotary heads with the sub-code signal which has the bit rate twice that at the conventional recording in the half-speed mode. Accordingly, the new sub-code signal is over-written in the sub-code signal regions 15a and 15b on the magnetic tape 26 on which information is already recorded. At this time, the sub-code signal which was recorded previously is erased, and only the over-written sub-code signal remains.

Further, when one of the two rotary heads scans regions on the track other than the sub-code signal regions 15a and 15b , the recording amplifier 51 is switched into the disable state, and the reproducing amplifier 33 is switched into the active state in accordance with the timing control signal from the timing control circuit 30. Correspondingly, the signals reproduced from the two rotary heads are obtained from the reproducing amplifier 51. FIG. 7(G) schematically shows the PCM audio data from the reproducing amplifier 51.

At the time after recording, in response to a memory switching signal shown in FIG. 7(H), the memories 41 and 42 perform the write and read-out operations which are the same as those described before by referring to FIGS. 5(A) through FIGS. 5(K). This memory switching signal is inverted for every two revolutions of the rotary drum 24, and therefore is identical to the memory switching signal shown in FIG. 5(B). The error detecting and correcting circuit 43 carries out the error detecting and correcting operations for the data read out from the memories 41 and 42. FIGS. 7(I) and 7(J), which correspond to FIGS. 5(C) and 5(D), schematically show the write and read operations of the memories 41 and 42 and the error detecting and correcting operation, respectively.

Therefore, the reproduces audio signals belonging to the sections ④, ©,®, . . . are sent from the D/A coverter 44 to the output terminal 45, as shown in FIG. 7(K). On the other hand, the data relating to the sections ®,®, . . . aree not outputted as the reproduced audio signal. Therefore, the reproduced audio signal which is constituted by data of every other frame can be obtained as the audio signal for monitoring at the time of the after recording. At this time, since all the sampled data in each of the frames ⓐ, ⓒ, ⓔ, ... are outputted with the sampling frequency Fs which is identical to the frequency at the time of the recording, the pitch does not vary from the point of view of the auditory sense.

A description will now be given of the mode #2 indicated previously.

Referring to FIG. 1, the memory switching signal which is inverted every one revolution of the rotary drum 24 is supplied from the timing control circuit 30 to the memories 41 and 42 together with the address signal. Then, the memory 41 and the error detecting and correcting circuit 43 perform an operation as schematically shown in FIG. 6(C), whereas the memory 42 and the error detecting and correcting circuit 43 perform an operation as schematically shown in FIG. 6(D). As may be seen from FIGS. 6(C) and 6(D), all of the PCm audio data are written into the memories 41 and 42 and corrected therein. Thereafter, the corrected PCM audio data are alternately read out from the memories 41 and 42 for every one revolution of the rotary head 25 and the rotary drum 24. The read-out PCM audio data are PCM audio data which are reproduced from the hatched latter half of each track in FIG. 6(A). The PCM audio data are beforehand interleaved and is time series composite data composed of data sampled at every other sampling time (even numbered sampling times, for example). Therefore, the audio data have a pitch which is twice that of original audio data. Of course, the addresses for the read-out may be generated so as to reproduce the former half of each of the tracks.

A more detailed description will be given of the mode #2, by newly referring to FIGS. 8(A) through 8(K).

FIGS. 8(A) through 8(G) are identical to FIGS. 7(A) through 7(G) and an explanation thereof is therefore omitted. As shown in FIG. 8(H), all of the PCM audio data A1 and A2 are written into the memory 41. these PCM audio data A1 and A2 are data which are reproduced from two mutually adjacent tracks for every one revolution of the rotary drum 24 in accordance with a memory switching signal (which is identical to the memory switching signal shown in FIG. 6(B). The PCM audio data in the memory 41 are once read out and are subject to the error correction in the error detecting and corresponding circuit 43. The corrected PCM audio data are again written into the memory 41. During the next one revolution period of the rotary drum 24, PCM audio data B1 and B2 from the next two successive tracks are all written into the memory 42 and corrected, as shown in FIG. 8(J). During this time period, the PCM audio data which are recorded on the latter half of each of the tracks A1 and A2 are read out from the memory 41.

Figure 8:
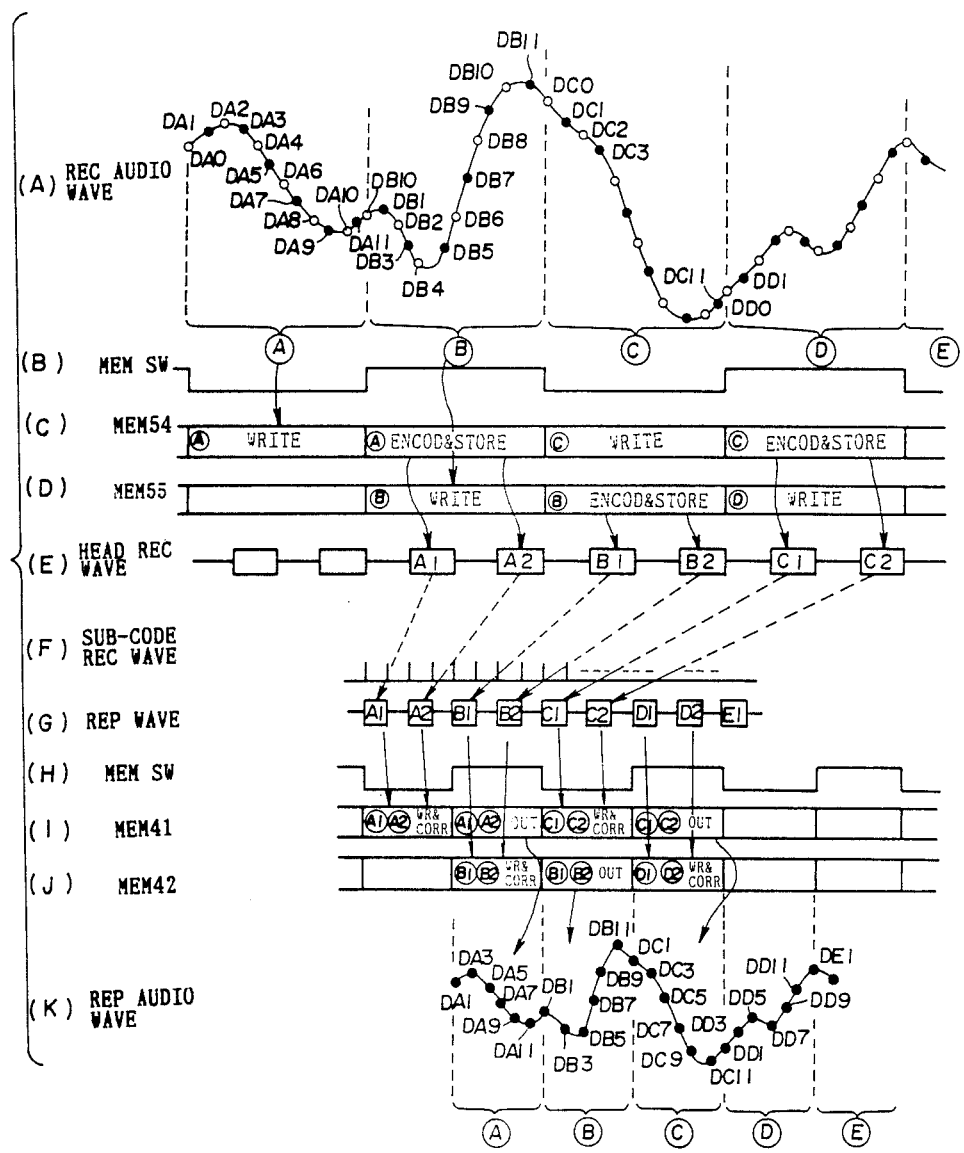
FIGS. 8(A) through 8(K) are views for explaining the operations shown in FIGS. 6(A) through 6(D) in more detail.

As described in the foregoing, the reproduced PCM audio data relating to the latter half of each track are data sampled at even numbered sampling times. For example, there exist data DA7, DA9, and DA11 in the latter half of the PCM audio data A1 and there exist data DA1, DA3, and DA5, in the latter half of the PCM audio data A2. Therefore, the reproduced audio signal for monitoring which is fed from the D/A converter 44 to the output terminal 45 becomes as shown in FIG. 8(K). Each of all the sampled data which are outputted at this time are outputted to the output terminal 45 with the sampling frequency Fs identical to the sampling frequency at the time of the recording. The sampled data applied at the output terminal 45 are data which are extracted from the original sampled data for every other sampling time. Therefore, the pitch of audio becomes twice that of the original audio. However, since the audio signal for monitoring at the time of the after recording is constituted by data which are equally extracted from each frame, a lacking of an audio signal corresponding to one frame does not occur.

A description will be given on a detailed circuit configuration of the timing control circuit 30 shown in FIG. 1.

Figure 9A:
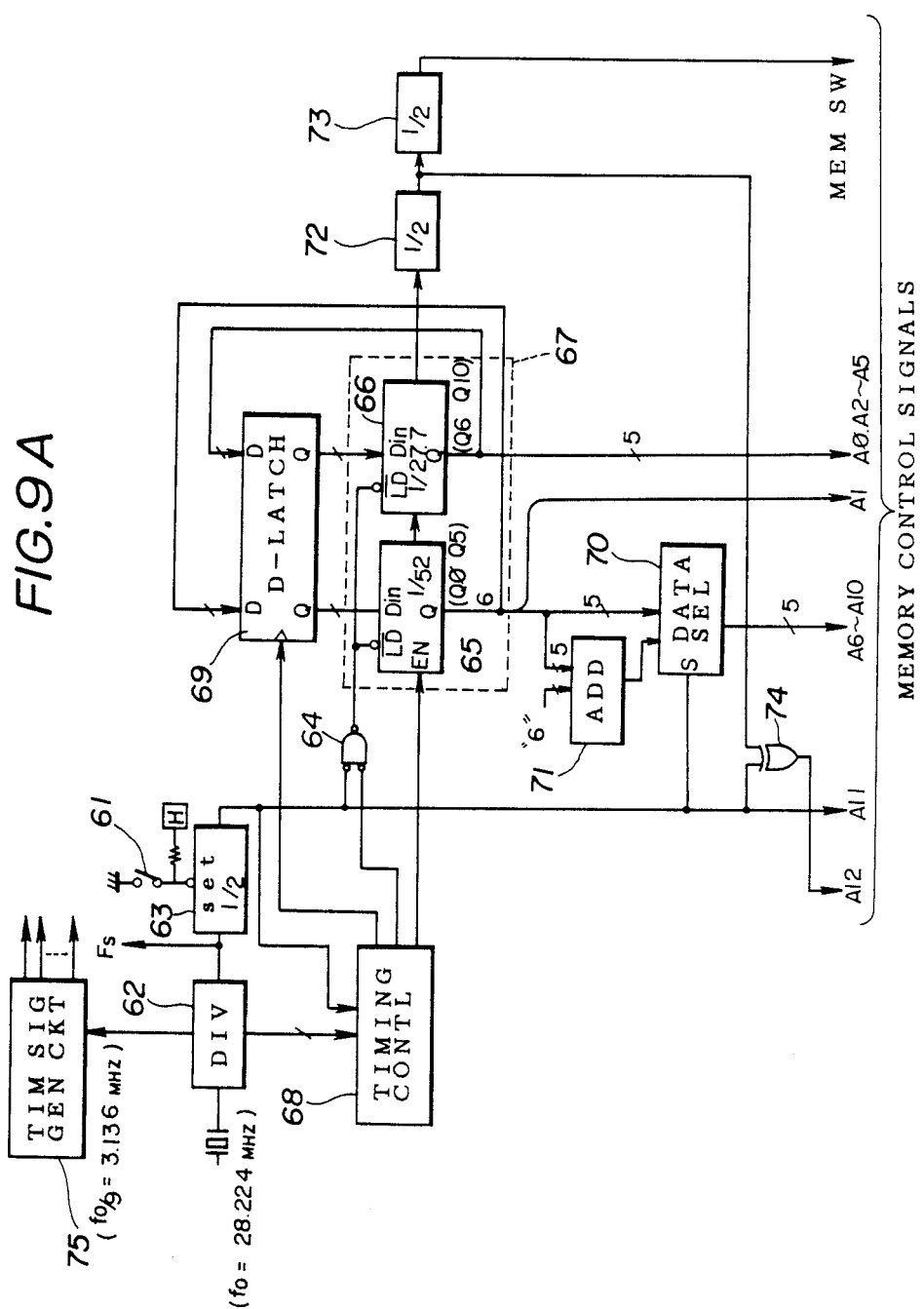
FIG. 9A is a circuit diagram of a timing control circuit shown in FIG. 1.

FIG. 9A illustrates a circuit configuration of the timing control circuit 30. As illustrated in FIG. 9A, the timing control circuit 30 comprises an address generating circuit part for generating the memory switching signal and address signals (A0-A12), and a timing signal generating circuit 75 for generating timing signals for peripheral circuits other than the memories.

A description will be given of a circuit constitution of the address generating circuit part for de-interleaving (address for D/A conversion) which is suitable for both the modes 190 1 and #2.

First, an explanation is given with respect to an operation at the time of the conventional reproduction at the half-speed mode as well as at the time of the reproduction based on the reproduction method #1 in the address generating circuit part. At the time of these reproduction operations, a switch 61 shown in FIG. 9A is maintained open. Thus, a flip-flop 63 is made active and divides a pulse train derived from a divider 62 by $\frac{1}{2}$ frequency. The pulse train from the divider 62 has a frequency which is the same as the sampling frequency Fs (32kHz in this example). The $\frac{1}{2}$ frequency-divided pulse train from the flip-flop 63 shown in FIG. 10(A) is outputted as an address signal $A_{11}$ at the twelfth bit and also supplied to a gate circuit 64.

A counter 65 is a 1/52 frequency divider and a counter 66 is a 1/27.7 frequency divider. The combination of these counters makes a 1/1440 frequency divider 67. However, as will be described later, in the model #1, the counters 65 and 66 each count the same values two times when a load pulse signal is applied to termianls LD thereof. For this reason, actually the combination of the counters 65 and 66 corresponds to a 1/2880 frequency divider. The counter 65 counts up every time when receiving three consecutive enable pulses per a sampling period 1/Fs shown in FIG. 10(B) from a timing controller 68. Then, the counter 65 produces a count value shown in FIG. 10(C). This count value is composed of six bits $Q_0$ to $Q_5$. *Further, as shown in FIG. 10(D), the counter 65 applies a carry output signal as an enable pulse to the counter 66 when its count value is changed from "55" to "0".*

A D-type latch circuit 69 is a register for latching the outputs of the counters 65 and 66 in synchronization with a latch pulse which is generated by a timing controller 68 every other sampling period 1/Fs. The latched count values of the counters 65 and 66 form respective initial count values when the load pulse signal is applied to the respective terminals LD. The gate circuit 64 inputs the output pulses of the flip-flop 63 and the timing controller 68, and produces output pulses shown in FIG. 10(F). An output of the gate circuit 64 is supplied as the load pulse signal to the counters 65 and 66. As may be seen from FIGS. 10(C) and (F), when the load pulse signal is applied to the counters 65 and 66, the same values are repeated during the odd numbered sampling period. For example, during the odd numbered sampling period corresponding to the word number '1', the count values '0', '1' and '2' are repeated as shown in FIG. 10(C). During the odd numbered sampling period, a data selector 70 continues to select an output of an adder 71 in response to the output pulse of the flip-flop 63, whereas during a period other than the odd numbered sampling period, the data selector 70 continues to select first five bits on the most significant bit side of the count value of the counter 65 which is made up of six bits $Q_0$ $Q_5$. The adder 71 adds the value "6" to these five bits from the counter 65. Therefore, the output of the adder 71 forms block addresses (76–127, for example) for the odd numbered sampling data. The lowest bit out of the six bits derived from the counter 65 is outputted as an address A1.

Bits $Q_6$ to $Q_{10}$ provided by the counter 66 become as shown in FIG. 10(G) and are fed to the memories 41 and 42 as addresses A0 and A2 to A5 and to the D-type latch circuit 69. A flip-flop 72 frequency-divides the carry output of the counter 66 by $\frac{1}{2}$ and generates an output pulse shown in FIG. 10(H). The output pulse of the flip-flop 72 is supplied to a flip-flop 73 and an exclusive OR circuit 74. The flip-flop 73 frequency-divides the inputted pulse by $\frac{1}{2}$ and generates a pulse which is inverted every two revolutions of the rotary drum 24. The output pulse of the flip-flop 73 is the memory switching signal mentioned previously. The exclusive OR circuit 74 produces an pulse shown in FIG. 10(K) by use of both the signals shown in FIGS. 10(A) and 10(H). The pulse shown in FIG. 10(K) forms an address A12 at the thirteenth bit of the address signal.

Bits A0–A4 form a symbol address and bits A5–A11 form a block address. A bit A12 forms the track selecting address, as mentioned above. These addresses are supplied to the memories 41 and 42 together with the memory switching signal as the addresses for de-interleaving. FIG. 10(I) shows the symbol address A0–A4 and FIG. 10(J) shown the block address A11–A5. Further, FIG. 10(L) shows the output data of the D/A converter 44, in which character "R" represents data relating to the right channel and "L" represents data relating to the left channel.

Figure 10:
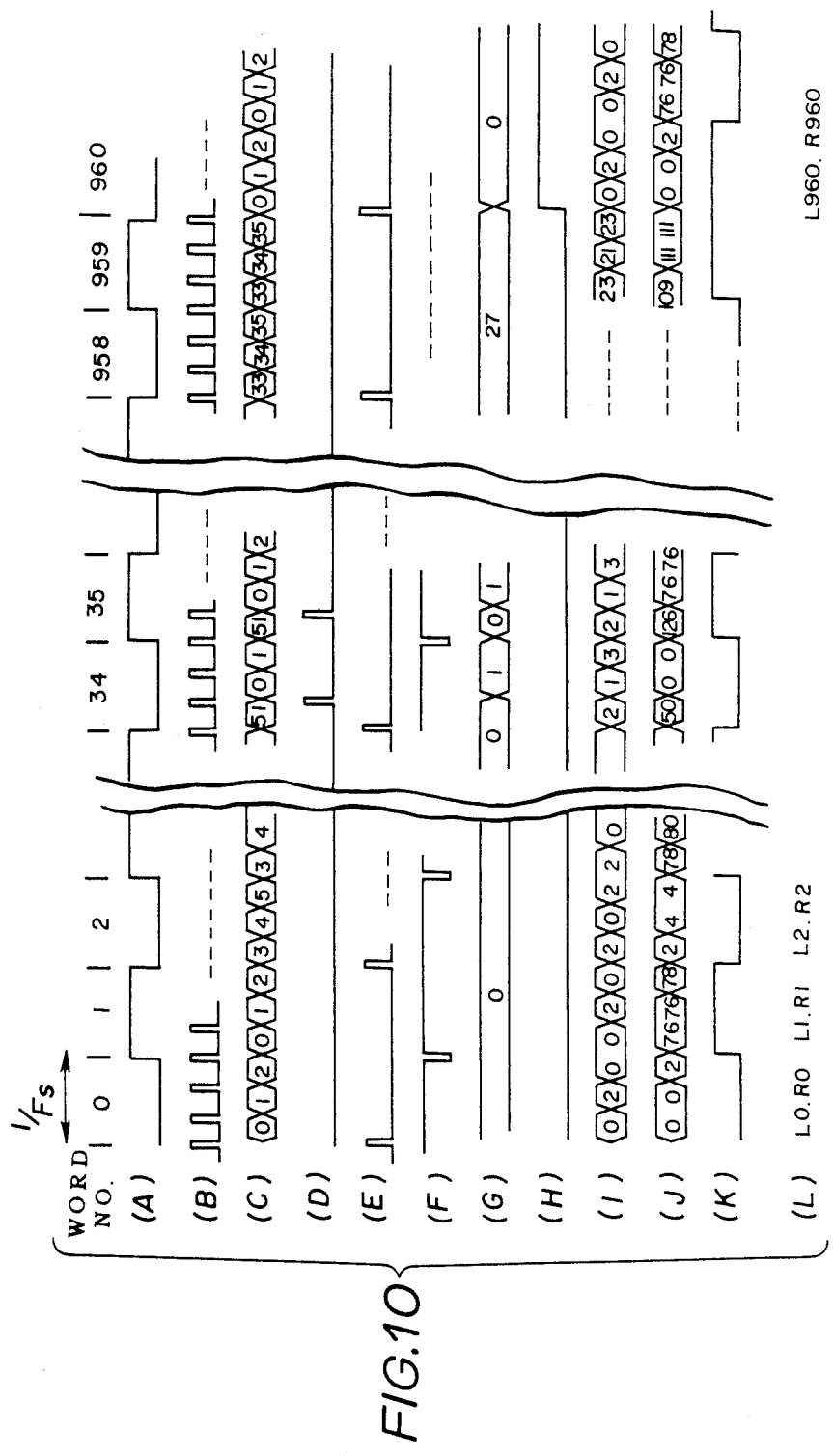
FIG. 10(A) through 10(L) and 11(A) through 11(H) are respectively views for explaining an operation of the circuit shown in FIG. 9.
Figure 11:
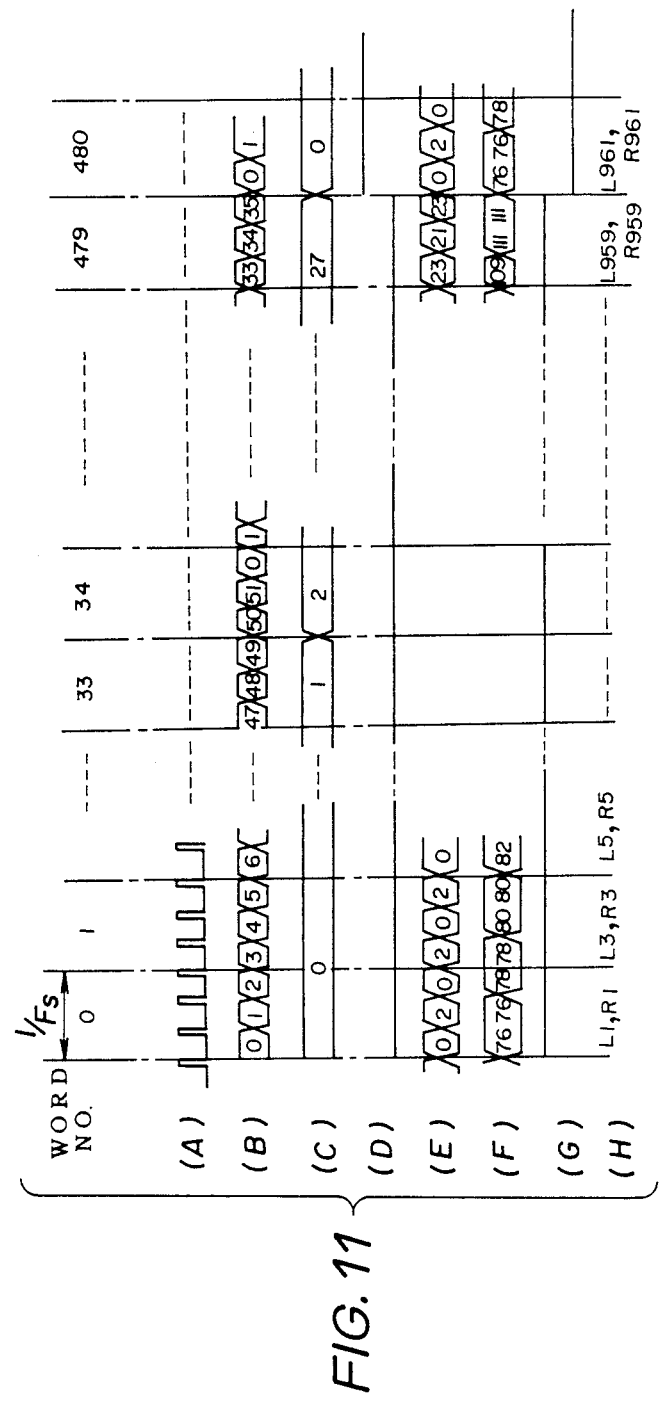

As shown in FIGS. 10(A) through 10. (L), three data (3 bytes) are accessed per a sampling period 1/Fs. The first data of the three accessed data includes the upper 8 bits on the left channel, the third data thereof includes the upper 8 bits on the right channel, and the second data thereof includes the lower 4 bits on each of the right and left channels A description will be given of an operation based on the reproducing method #2. In this case, the switch 61 shown in FIG. 9A is maintained closed and the output of the flip-flop 63 is fixed at a high level. Therefore, the output of the gate circuit 64 is always kept in the high level and the counters 65 and 66 are not provided with the load pulse signal. As a result, as shown in FIG. 11(B), the counter 65 simply counts up in response to the enable pulse shown in FIG. 11(A) from the timing controller 68. Since the counters 65 and 66 form the 1/1440 divider at this time, the output signal of the flip-flop 72 is, as shown in FIG. 11(D), inverted every period which is one-half that in the mode #1 shown in FIG. 10(H). Corresponding, the memory switching signal obtained from the flip-flop 73 is inverted every one revolution of the rotary drum 24. FIG. 11(C) shows the count value of the counter 66.

On the other hand, the data selector 70 always selects the output of the adder 71, because the output signal of the flip-flop 63 is fixed to the high level. Therefore, the sampled data relating to odd numbered sampling times are always outputted from the data selector 70. The symbol address composed of bits A4 to A0 is as shown in FIG. 11(E) and the block address composed of A11 to A5 is as shown in FIG. 11(F). Further, the track selecting address A12 is as shown in FIG. 11(G). As a result, according to the mode #2, the data read out from the memories 41 and 42 in the manner described above are converted into the corresponding analog signal by the D/A converter 44 in the order which is shown in FIG. 11(H), and are outputted.

As described, the addresses for the de-interleaving supplied for the conventional reproduction in the half-speed mode as well as the after recording in the modes #1 and #2 can easily be generated.

Figure 9B:
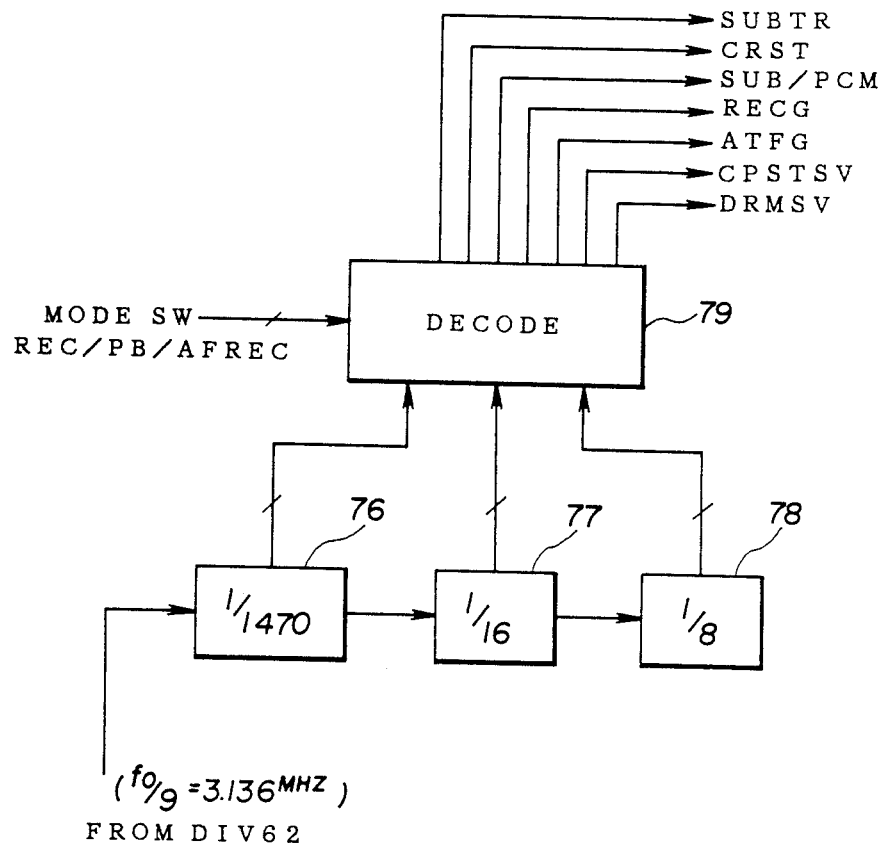
FIG. 9B is a circuit diagram of a timing signal generating circuit shown in FIG. 9A.

A description will be given of a detailed configuration of the timing signal generating circuit 75 shown in FIG. 9A, by referring to FIGS. 9B and 9C. FIG. 9B is a detailed circuit of the timing signal generating circuit 75, and FIG. 9C shows timing of timing signals in the after recording mode at a frequency of 32 kHz.

In FIG. 9B, a counter 76, which is a 1/1470 frequency divider, receives an output signal of a frequency of 3.136 MHz ($f_0/9$) derived from the divider 62. An output of the counter 76 is supplied to a counter 77 and a decoder 79. The counter 77 is a 1/16 frequency divider. An output of the counter 77 is fed to the decoder 79 and a counter 78, which is a $\frac{1}{8}$ frequency divider. The decoder 79 generates timing signals shown in FIG. 9C on the basis of the output signals of the counters 76, 77 and 78. FIGS. 9C(a) and 9C(b) show waveforms of the reproduced head signal and the memory switching signal which are the same as those shown in FIGS. 5A and 5B, respectively. FIG. 9C(c) shows the reference signal (DRMSV) of a frequency of 100/3 Hz in this example for the drum servo. The rotation control of the drum 24 is controlled by this signal and the reproduced head signal having the phase as shown in FIG. 9C(a) is obtained. FIG. 9C(d) shows a tracking reference signal sampling signal (ATFG) for performing the capstan motor control by the tracking reference signal. The capstan motor control is carried out so that at the time of the recording, the capstan servo which is phase-controlled by the reference signal (CPSTSV) in the same way as the drum servo is performed, whereas at the time of the reproduction and the after recording the capstan servo by use of the tracking reference signal is performed. At the time of the reproduction in the standard mode (Fs=48 kHz), as shown in FIG. 9C(d), all of the tracking reference signal parts illustrated by dotted lines are used, whereas at the time of the after recording (FS=32 kHz) the tracking reference signal parts illustrated by the solid line are used. FIG. 9C(e) shows the switching signal (RECG) for selecting either the reproducing amplifier 33 or the recording amplifier 51. When the switching signal (RECG) is at a low level, the recording amplifier 51 is enabled and the sub-code is recorded on the magnetic tape 26. FIG. 9C(f) shows the signal (SUB/PCM) for discriminating the PCM signal region 13 and the sub-code regions 15a and 15b shown FIG. 2. In the PCM audio data region, the demodulating circuit 39 demodulates the reproduced signal and writes the demodulated signal into either the memory 41 or 42. In the sub-code regions, the modulating circuit 50 modulates the sub-code signal from the sub-code interface circuit 28 and records the same on the magnetic tape 26 through the recording amplifier 51. FIG. 9C(g) shows a start pulse (CRST) for initiating the error correcting operation of the error detecting and correcting circuit 23. FIG. 9C(h) shows a timing signal (SUBTR) for outputting the sub-code to an external circuit such as a central processing unit (CPU) through the output terminal 47. The transferring operation of the sub-code is carried out during a period when the timing signal (SUBTR) is at a low level, or the reproduced head signal is not obtained. FIG. 9C(i) shows the sampling frequency Fs. The A/D converter 53 converts the PCM audio data read out from the memories 54 and 55 into the corresponding analog signal in response to the timings defined by the sampling frequency Fs.

The present invention is not limited to the embodiments, but various variations and modifications may be made without departing from the scope of the present invention.

What is claimed is:

1. A rotary head type digital signal recording and reproducing apparatus for playing a magnetic tape prerecorded with a time division multiplexed signal which comprises a pulse code modulated audio data which is obtained by subjecting an original audio signal to a pulse code modulation and a sub-channel signal which amounts to a predetermined time period and which is time division multiplexed immediately before and after said pulse code modulated audio data for each track formed on said magnetic tape, wherein said time division multiplexed signal is recorded on or reproduced from successive tracks formed obliquely to a longitudinal direction of the magnetic tape by two rotary heads which are diametrically mounted on a rotary drum in a first mode or a second mode, and wherein in the second mode, a data quantity per unit time and a bit rate of said sub-channel signal are 1/n (n is an arbitrary integer equal to 2 or over) times those in the first mode, and wherein a rotational speed of said rotary heads and a tape transport speed of said magnetic tape in the second mode are also 1/n times those in said first mode, said rotary head type digital signal recording and reproducing apparatus comprising:

means for controlling the rotational speed of said magnetic heads and the tape transport speed of said magnetic tape on which data is recorded in the second mode so as to become identical to those in the first mode;

recording means for over-writing a new sub-channel signal to be recorded on the magnetic tape, said new sub-channel signal having a bit rate which is n times that at the time of the second mode; and demodulating means for receiving the pulse code modulated audio data which is read out from the magnetic tape and for producing a monitor audio signal which is obtained by discretely extracting PMC audio data from said received pulse code modulated audio data and which has a frequency identical to that at the time of the reproduction in the second mode.

2. A rotary head type digital signal recording and reproducing apparatus as claimed in claim 1, wherein said demodulating means produces said monitor audio signal by extracting data from said received pulse code modulated audio data for every other revolution of said rotary drum.

3. A rotary head type digital signal recording and reproducing apparatus as claimed in claim 1, wherein said demodulating means produces said monitor audio signal by extracting data from said received pulse code modulated audio data at every other sampling time.

4. A rotary head type digital signal recording and reproducing apparatus as claimed in claim 1, wherein said demodulating means comprises a first memory and a second memory each for inputting said received pulse code modulated audio data, and wherein in the second mode, said received pulse code modulated audio data is written alternately into and read out from said first memory or said second memory every two revolutions of said rotary drum.

5. A rotary head type digital signal recording and reproducing apparatus as claimed in claim 1, wherein said demodulating means comprises a first memory and a second memory each for inputting said received pulse code modulated audio signal, and wherein in the second mode, said received pulse code modulated audio data is alternately written into and read out from said first memory or said second memory every one revolution of said rotary drum.

6. A rotary head type digital signal recording and reproducing apparatus as claimed on claim 4, wherein said received pulse code modulated audio data is read out from each of said first and second memories within a period of the two revolutions of said rotary drum.

7. A rotary head type digital signal recording and reproducing apparatus as claimed in claim 5, wherein a half of said received pulse code modulated audio data corresponding to one track is read out from each of said first and second memories.

* * * * *